(12) United States Patent
Fujita

(10) Patent No.: US 8,867,075 B2
(45) Date of Patent: Oct. 21, 2014

(54) PRINT DATA PROCESSING APPARATUS FOR CONSOLIDATING PRINT OBJECTS

(75) Inventor: Ryo Fujita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 261 days.

(21) Appl. No.: 13/453,831

(22) Filed: Apr. 23, 2012

(65) Prior Publication Data

US 2012/0293832 A1 Nov. 22, 2012

(30) Foreign Application Priority Data

May 20, 2011 (JP) ................. 2011-114108

(51) Int. Cl.
*G06F 3/12* (2006.01)
*G06K 15/02* (2006.01)

(52) U.S. Cl.
CPC .......... *G06F 3/1243* (2013.01); *G06K 15/1861* (2013.01); *G06K 15/1856* (2013.01); *G06F 3/1244* (2013.01); *G06F 3/122* (2013.01); *G06F 3/1211* (2013.01)
USPC ....................................... 358/1.15

(58) Field of Classification Search
None
See application file for complete search history.

(56) References Cited

U.S. PATENT DOCUMENTS

| 7,345,782 B2 * | 3/2008 | Kumar | 358/1.16 |
| 7,872,765 B2 * | 1/2011 | Liu | 358/1.13 |
| 2011/0080602 A1 * | 4/2011 | Clark et al. | 358/1.9 |

FOREIGN PATENT DOCUMENTS

JP 2008-271098 A 11/2008

* cited by examiner

*Primary Examiner* — Jeremiah Bryar
(74) *Attorney, Agent, or Firm* — Fitzpatrick, Cella, Harper & Scinto

(57) ABSTRACT

A print data processing apparatus performs detection as to whether or not an identical resource is duplicated and described within print data. In a case where there is duplicated description, the duplicated resource is deleted from its second occurrence onward and the print objects are consolidated, the duplicated resources are deconstructed into individual resources and registered in a format that can be referenced in common from multiple print objects.

5 Claims, 13 Drawing Sheets

FIG. 10

```
<PAGE>

<MARK Position="0 0">                                              ⎫
   <OBJECT Position="50 400">                                        ⎪
    <SOURCE Format="application/postscript"Dimensions="200 300">    ⎪
     <EXTERNAL_DATA Src="PS RESOURCE A"/>                            ⎬ 501
     <EXTERNAL_DATA Src="PS COMMAND 1"/>                             ⎪
    </SOURCE>                                                        ⎪
   </OBJECT>                                                         ⎪
  </MARK>                                                            ⎭

<MARK Position="0 0">                                              ⎫
   <OBJECT Position="400 400">                                       ⎪
    <SOURCE Format="application/postscript"Dimensions="100 100">    ⎪
     <EXTERNAL_DATA Src="PS RESOURCE A"/>                            ⎬ 502
     <EXTERNAL_DATA Src="PS COMMAND 2"/>                             ⎪
    </SOURCE>                                                        ⎪
   </OBJECT>                                                         ⎪
  </MARK>                                                            ⎭

<MARK Position="0 0">                                              ⎫
   <OBJECT Position="50 50">                                         ⎪
    <SOURCE Format="image/jpeg"Dimensions="500 300">                ⎪
     <EXTERNAL_DATA Src="JPEG OBJECT 1"/>                            ⎬ 503
    </ SOURCE>                                                       ⎪
   </OBJECT>                                                         ⎪
  </MARK>                                                            ⎭

</PAGE>
```

FIG. 11

```
<PAGE>

<SUPPLIED_RESOURCES>
  <SUPPLIED_RESOURCE Name="FontA"ResourceName="FontA"
    Format="application/postscript"Type="Font" Src="FontA"/>
  <SUPPLIED_RESOURCE Name="FontB"ResourceName="FontB"
    Format="application/postscript"Type="Font"Src="FontB"/>
  <SUPPLIED_RESOURCE Name="ProcSet_1"ResourceName="ProcSet_1"
    Format="application/postscript"Type="ProcSet"Src="ProcSet_1"/>
 </SUPPLIED_RESOURCES>

<REQUIRED_RESOURCES>
  <SUPPLIED_RESOURCE_REF Name="FontA"/>
  <SUPPLIED_RESOURCE_REF Name="FontB"/>
  <SUPPLIED_RESOURCE_REF Name="ProcSet_1"/>
 </REQUIRED_RESOURCES>                                            } 601

<MARK Position="0 0">
  <OBJECT Position="50 400">
   <SOURCE Format="application/postscript"Dimensions="200 300">
    <EXTERNAL_DATA Src="PS COMMAND 1"/>
   </ SOURCE>
  </OBJECT>
 </MARK>                                                          } 602

<MARK Position="0 0">
  <OBJECT Position="400 400">
   <SOURCE Format="application/postscript"Dimensions="100 100">
    <EXTERNAL_DATA Src="PS COMMAND 2"/>
   </ SOURCE>
  </OBJECT>
 </MARK>                                                          } 603

<MARK Position="0 0">
  <OBJECT Position="50 50">
   <SOURCE Format="image/jpeg"Dimensions="500 300">
    <EXTERNAL_DATA Src="JPEG OBJECT 1"/>
   </ SOURCE>
  </OBJECT>
 </MARK>                                                          } 503

</PAGE>
```

PRINT DATA PROCESSING APPARATUS FOR CONSOLIDATING PRINT OBJECTS

BACKGROUND OF THE INVENTION

1. Field of the Invention

The present invention relates to print data processing apparatuses and print data processing methods that carry out processing of print data.

2. Description of the Related Art

In recent years demand has been expanding for variable data printing (hereinafter abbreviated to VDP) in which the data of customers is printed according to their individual needs. In VDP, the unit that expresses the print data of a single customer is referred to as a record. A record is a collection of pages and VDP has a feature of being able to increase the added value of printed matter by carrying out printing using content matched to the customer for each record. For VDP in digital printing, standard VDP languages such as PPML and PDF/VT are defined as page description languages (hereinafter abbreviated to PDL). These VDP languages can classify the images within the print data into reusable objects to be used multiple times and objects for which this is not the case. This is designed so that the image data of reusable objects is cached and the next time when the same object is to be rendered, the cached image data can be reused. By caching and reusing the image data of reusable objects, VDP languages have the advantage of enabling higher speed print processing. For example, PPML, which is one of the VDP languages, is designed so that objects to be reused can be classified as reusable objects and objects other than those can be classified as variable objects, and this enables print data processing according to each of these.

However, depending on the structure of the print data, when printing print data that is described using a VDP language, unfortunately sometimes a much longer time is required than for printing print data that is described using a PDL that is not a VDP language. This type of problem can occur in a case where the print data is of a structure in which identical resource files are processed in a duplicated manner for multiple print objects (sometimes referred to simply as objects) contained within the data. As one example, description is given with FIG. 12 using PPML as the VDP language. With PPML, it is possible to include multiple different print objects described in PDL within the print data as content. In FIG. 12, description is given using an example of a case where PostScript (a registered trademark that is hereinafter abbreviated to PS) is used in the content. With PS, it is possible for print objects to use resources. Types of PS resources include fonts, ProcSets, which are collections of command definitions, forms, and color renderings that represent color profile settings. Suppose that there are four PS objects within a set of PPML print data, and that an identical PS font file 1 is duplicated and independently described in each of the PS objects. Unfortunately in this case, when processing the PPML print data, the process is performed for the number of times that the PS font file 1 is described, namely four times. In contrast to this, FIG. 13 shows an example of a case where the same content is described as PS print data rather than PPML data.

In FIG. 13, processing can be achieved with the PS font file 1 being described only once the first time it is used. Thus, the PS font file 1 is processed more times and the processing time becomes undesirably longer in the case of using PPML. Although it is a feature of print data described in a VDP language that it is designed to enable shorter processing times, with this type of print data, a VDP language instead requires longer processing times.

A conventional technique described in Japanese Patent Laid-Open No. 2008-271098 is available as a means for solving this issue. This patent literature describes a document merging method in which, when merging different digital documents, the merged file size can be kept small by performing the merging after deleting common resources. When this conventional technique is applied to print data processing, it is possible not only to keep the merged file size small, but also to shorten the processing time of the print data.

However, the above-described conventional technique can only be applied in a case where print objects that use same resources are described successively within the print data. Since print objects targeted for shortening processing times are not necessarily described successively within the print data, a more widely applicable method is desired for further increasing the efficiency of print data processing.

SUMMARY OF THE INVENTION

The present invention has been devised to address these issues. The present invention provides a system in which, in processing print data in which an identical resource is duplicated and described in multiple print object, the processing of duplicated resources can be reduced and print data processing times can be reduced.

The present invention is provided with a following configuration.

According to one aspect of the present invention, a print data processing apparatus is provided which comprises: a receiving unit configured to receive print data having a first print object and a second print object on one page; and a consolidation unit configured to, in a case where a determination has been made that the first print object and the second print object are using identical resource files and a determination has been made that the first print object and the second print object are described successively within the print data, delete the identical resource file from the second print object and consolidate the first print object and the second print object.

With the present invention, when carrying out processing of print data in which an identical resource is duplicated and described in multiple print objects, reductions of operability of the processing apparatus can be avoided and the time required in print data processing can be shortened. In this event, shortening of the processing times can be achieved without being dependent on the description order of print objects in which the identical resource is duplicated and described.

Further features of the present invention will become apparent from the following description of exemplary embodiments with reference to the attached drawings.

BRIEF DESCRIPTION OF THE DRAWINGS

FIG. 10 is a diagram showing an example of a description of print data.

FIG. 11 is a diagram showing an example of a state in which a description of print data has been altered.

DESCRIPTION OF THE EMBODIMENTS

Embodiment 1

Figure 1:
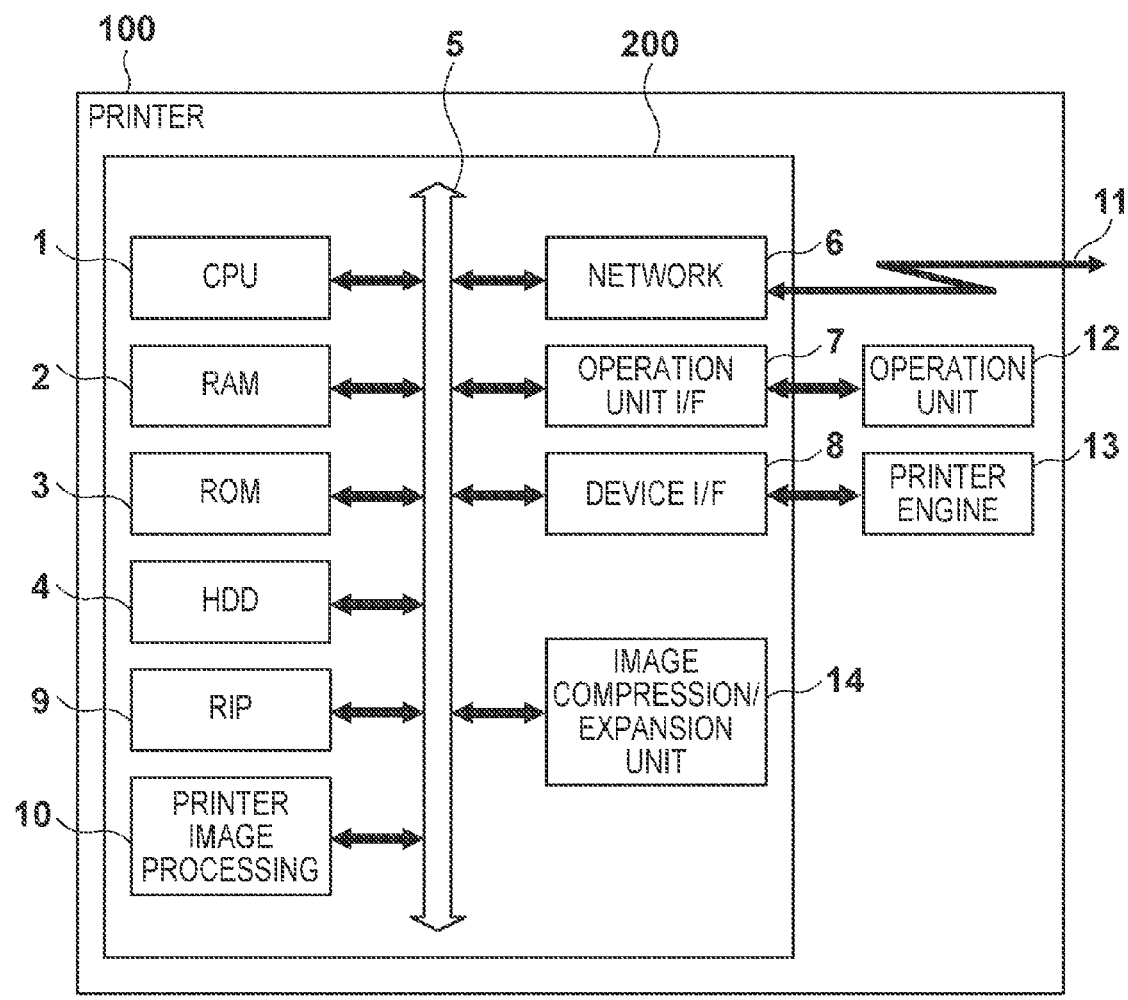
FIG. 1 is a hardware block diagram for describing one working example according to the present invention.

Hereinafter, embodiments for executing the present invention are described using the accompanying drawings. FIG. 1 is a hardware block diagram for describing a configuration of a printer 100, which is a print data processing apparatus in which the present working example is applied. It should be noted that the present working example is described using a standalone configuration of a print data processing apparatus, but a configuration is also possible in which large amounts of processing are separated and executed by a host computer that is connected via a network.

In FIG. 1, numeral 200 represents a controller unit that controls the input and output of image signals and device information. A CPU 1 reads out programs that are stored in a ROM 3 or a HDD 4 to a RAM 2 and executes these programs. Further still, the CPU 1 performs general control for each device connected via a system bus 5. The RAM 2 functions as a main memory of the CPU 1 and a work memory. A boot program that is executed at the time of powering on is stored in the ROM 3, and an operating system and control programs of the apparatus itself are stored on the HDD 4. Furthermore, the HDD 4 is also used for a purpose of temporary or long term storage of large volumes of data such as image data and print data or the like. A network 6 is connected to a local area network 11 and supports input and output of print data and device information outside of the printer. An operation unit I/F 7 is an interface unit to an operation unit 12 and outputs image data to the operation unit 12 to be displayed on the operation unit 12. Furthermore, the operation unit I/F 7 performs a role of transmitting information that has been inputted by a user of the apparatus itself from the operation unit 12 to the CPU 1. The operation unit 12 is provided with a liquid crystal panel and an audio source as output devices and is provided with a touch panel and hard keys as input devices. The controller unit 200 is connected to a printer engine 13 through a device I/F 8. Based on instructions from the CPU 1, the device I/F 8 carries out the sending of image signals, the instructing of device operations, and the receiving of device information. The printer engine 13 is an output device that outputs image signals from the controller unit 200 onto a medium and may be of a method such as an electrophotographic method or an inkjet method. A raster image processor (RIP) 9 is specialized hardware for rendering intermediate print data into a raster image. The RIP 9 processes the intermediate print data generated by the CPU 1 in the RAM 2 at high speed and in parallel to the execution of the CPU 1. A printer image processing unit 10 carries out image correction and halftoning and the like with respect to print output image data. An image compression/expansion unit 14 carries out compression and expansion processing of the image data.

Software Configuration of Print Data Processing Apparatus

Figure 2A:
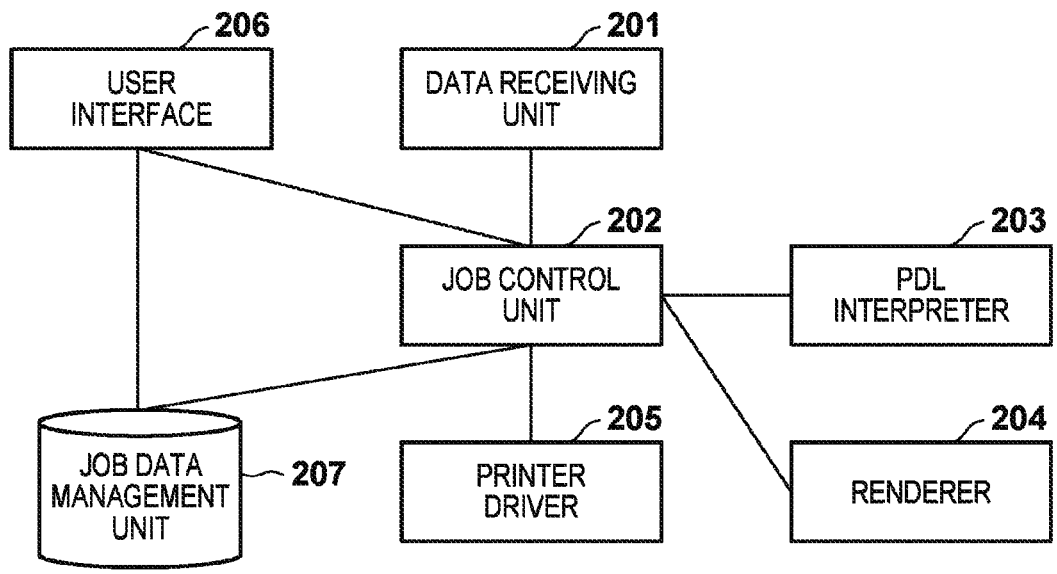
FIG. 2A is a software block diagram for describing one working example according to the present invention.

FIG. 2A is a software module configuration diagram of a print data processing apparatus (printer 100). Each of the software modules cited in FIG. 2A is stored in the HDD 4 as a program to be loaded into the RAM 2 and executed by the CPU 1. A data receiving unit 201 receives print data that has been sent from a host. The received print data is stored into a job data management unit 207 via a job control unit 202. The job control unit 202 administers overall job control from data reception until printing. A PDL interpreter 203 interprets the print data and generates a display list, which is intermediate data. The generated display list is stored into the job data management unit 207 via the job control unit 202. A renderer 204 is a module that generates a bitmap image from the display list and a majority of its processing is executed by the specialized hardware RIP 9. The generated bitmap image is stored into the job data management unit 207 via the job control unit 202. A printer driver 205 carries out the sending of printing instructions and bitmap images to the printer engine 13 via the device I/F 8. A user interface 206 is a module for performing control of the operation unit 12 through the operation unit I/F 7. Mainly the user interface 206 generates data to be displayed on the liquid crystal panel of the operation unit 12 and updates the display on the liquid crystal panel in accordance with input from the touch panel. Furthermore, in a case where the input from the touch panel is some kind of job execution instruction, it transmits this instruction to the job control unit 202. The job data management unit 207 is a database that performs temporary or long term storage and management of print data, display lists, and bitmap images.

Configuration of PDL Interpreter

Figure 2B:
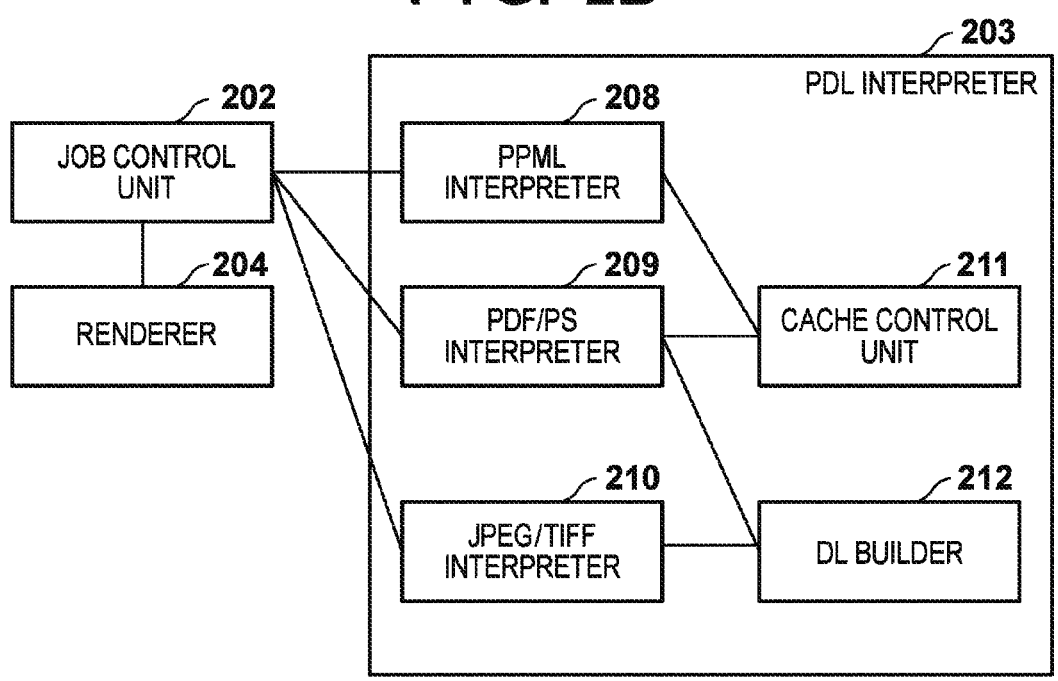
FIG. 2B is a software block diagram for describing details of a PDL interpreter.

FIG. 2B is a software module configuration diagram in which the PDL interpreter 203 of FIG. 2A is described in more detail. It should be noted that although description is given in the present embodiment supposing that the page description language (PDL) contained in the print data is PPML, configurations provided with an interpreter of a different VDP language such as PDF/VT or the like are also possible. Furthermore, although description is given in the present embodiment supposing PostScript (a registered trademark that is hereinafter abbreviated to PS), PDF, JPEG, and TIFF as four types of content PDLs of the PPML data, it is also possible to use combinations of content PDLs other than this. A PPML interpreter 208 carries out interpretation of PPML data. A PDF/PS interpreter 209 carries out interpretation of PS data and PDF data. A JPEG/TIFF interpreter 210 carries out interpretation of JPEG data and TIFF data. Furthermore, the PDF/PS interpreter 209 and the JPEG/TIFF interpreter 210 output display lists, which are intermediate data according to a DL builder 212. A cache control unit 211 caches drawing objects as a bitmap image or in a display list format. In a case where reusability of a drawing object is indicated in the PPML data, the PPML interpreter 208 works in cooperation with the cache control unit 211 to carry out reuse of the drawing object.

Print Processing of PPML Data

Figure 3:
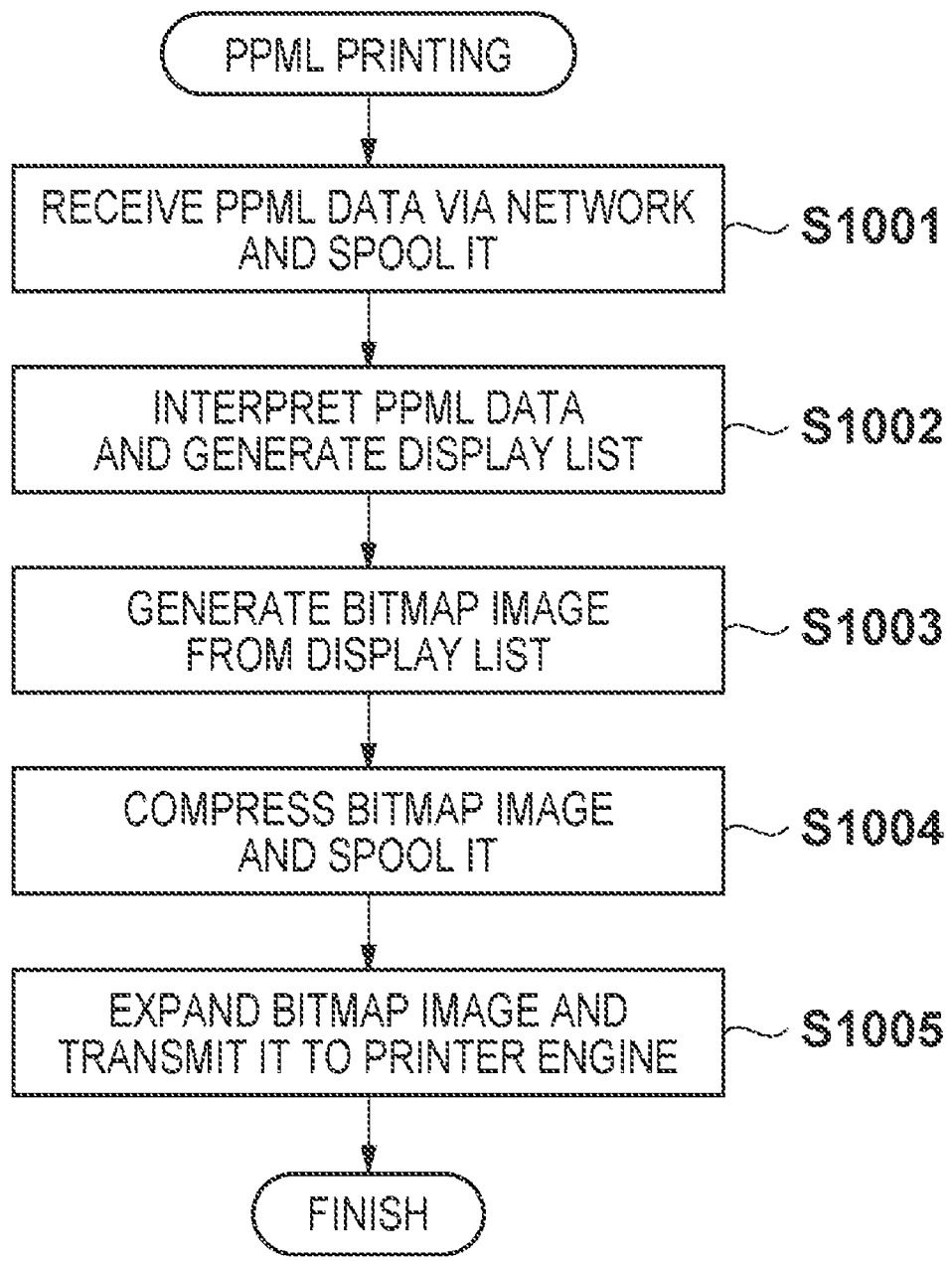
FIG. 3 is a flowchart of print processing of PPML data.

Next, description is given using a flowchart in FIG. 3 of an outline of print processing of PPML data. It should be noted that the present invention is described such that it is executed according to the software modules in FIG. 2A and FIG. 2B.

Furthermore, the present flowchart is achieved by having the programs within the software modules of FIG. 2A and FIG. 2B stored in the HDD 4 read out to the RAM 2 and executed by the CPU 1.

First, at S1001, the data receiving unit 201 receives PPML data that has been sent from a host computer via the network, and a job input notification is carried out to the job control unit 202. Then, the job control unit 202 spools the received PPML data in the job data management unit 207. Next, at S1002, the job control unit 202 gives instruction for interpretation of the PPML data to the PPML interpreter 208. The PPML interpreter 208 interprets the PPML data and works in coordination with the PDF/PS interpreter 209, the JPEG/TIFF interpreter 210, the DL builder 212, and the cache control unit 211 to generate a display list, which is intermediate data. The job control unit 202 temporarily stores the generated display list in the job data management unit 207. Next, at S1003, the job control unit 202 gives instruction to the renderer 204 such that the display list is transformed into a bitmap. Using the RIP 9, the renderer 204 transforms the display list into a bitmap image. Next, at S1004, the job control unit 202 compresses the generated bitmap image using the image compression/expansion unit 14, and temporarily stores this in the job data management unit 207. It should be noted that the display list for which bitmap transformation has been completed is deleted from the job data management unit 207 by the job control unit 202. Next, at S1005, the job control unit 202 gives instruction to the printer driver 205 for the bitmap image to be sent to the printer engine 13. The printer driver 205 sends the bitmap image while in synchronization with the printer engine 13. Furthermore, prior to sending, the printer driver 205 carries out an expansion process of the bitmap image using the image compression/expansion unit 14. The printer driver 205 deletes from the job data management unit 207 the bitmap image for which sending to the printer engine 13 has been completed. It should be noted that the processing from S1002 to S1005 is configurable such that collective processing is carried out on the data of all the pages or such that successive processing is carried out for each page. In a case where successive processing is to be carried out for each page, the processing from S1002 to S1005 is pipelined and each process is executed in parallel.

Consolidated Processing of Objects

Figure 4:
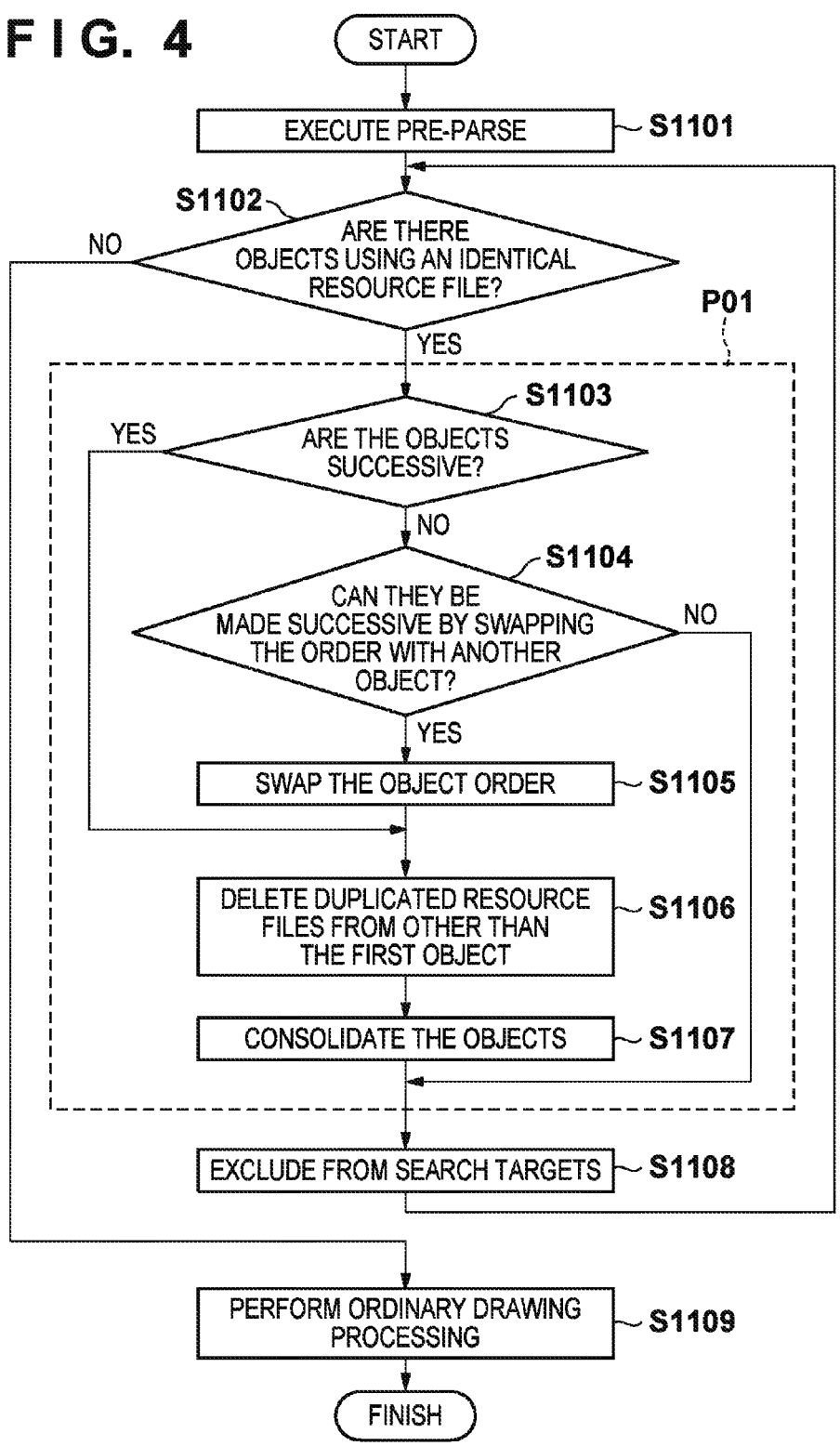
FIG. 4 is a flowchart of a method for shortening resource processing times according to working example 1.

Description is given using FIG. 4 regarding a method for shortening resource processing times according to the present working example. This processing is carried out while the PPML print data is interpreted, that is, during S1002 of FIG. 3. It should be noted that description is given in the present working example supposing that the targets for shortening resource processing times are PS objects in the PPML print data, but higher-speed processing can also be achieved by targeting print data and print objects described by other PDLs.

First, detection is performed in a pre-parse by the PPML interpreter 208 at S1101 as to whether or not there are multiple print objects within the print data that use an identical resource. Pre-parsing refers to a process in which information required in print data processing such as the number of pages of print data and the arrangement of objects is collected prior to commencing the rendering process of print data. In a case where a result of the pre-parse is that multiple print objects are not present that use an identical resource, the procedure proceeds to S1109 and the rendering process described using FIG. 3 continues without adding any change to the print data.

Figure 8:
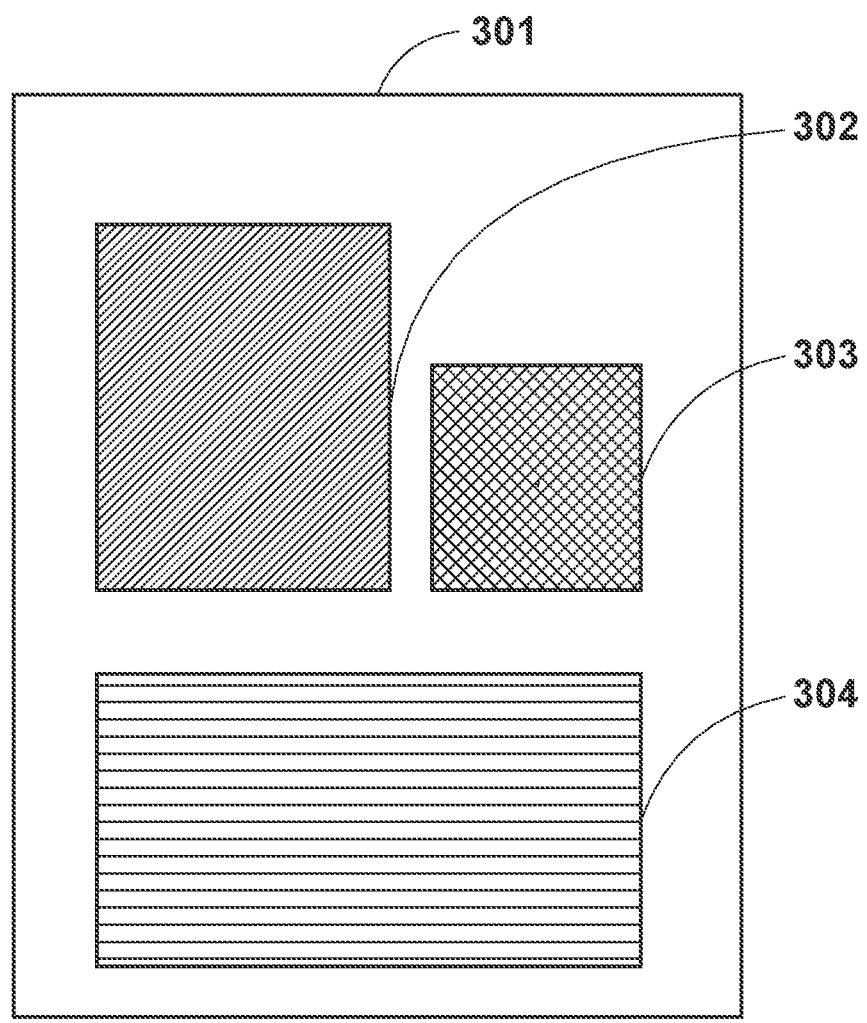
FIG. 8 is a diagram showing an arrangement example of print objects within print data.
Figure 9A:
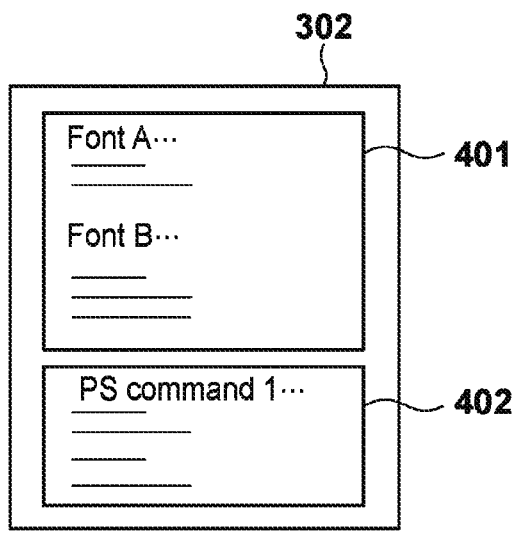
FIG. 9A is a diagram illustrating a configuration of a PS object 1 according to working example 1.

Next, description is given regarding processing in a case where there are multiple print objects that use an identical resource. First, if there are objects that use an identical resource file as an object of interest, the PPML interpreter 208 performs a determination at S1103 in regard to these objects of interest as to whether or not the print objects are described successively within the print data. If they are described successively, duplicated resources are deleted then processing proceeds to consolidating the print objects. As one example, description is given using a case where there is a page 301 such as in FIG. 8 within the print data. In the page 301 of FIG. 8, there are a PS object 302 (for example referred to as a first print object), a PS object 303 (for example referred to as a second print object), and a JPEG object 304 as three print objects described in that order. Further still, suppose that a PS resource file A, which is an identical resource file, is defined in the PS object 302 and the PS object 303. FIG. 9A illustrates an example of the contents of the PS object 302. In the present working example, a PS resource file 401 and PS command file 402, which are two sets of PS data, are contained in the PS object 302. Fonts and ProcSets required to draw the PS object 302 are described in the PS resource file 401. The PS command file 402 contains PS commands for carrying out rendering processing of the PS object 302 using resources defined in the PS resource file 401. Similarly, the PS object 303 in FIG. 9B also contains the PS resource file 401 and a PS command file 403.

Figure 9B:
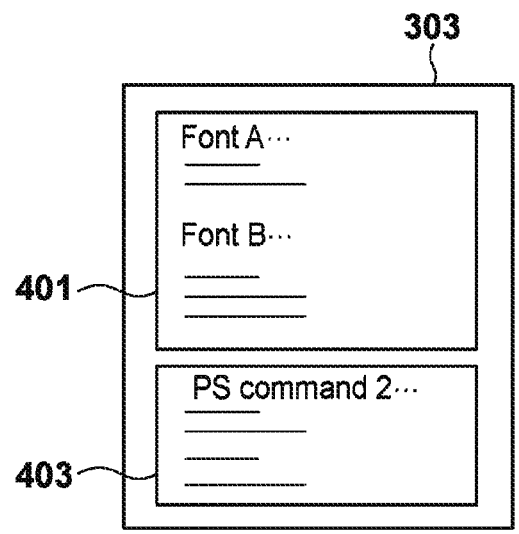
FIG. 9B is a diagram illustrating a configuration of a PS object 2 according to working example 1.
Figure 9C:
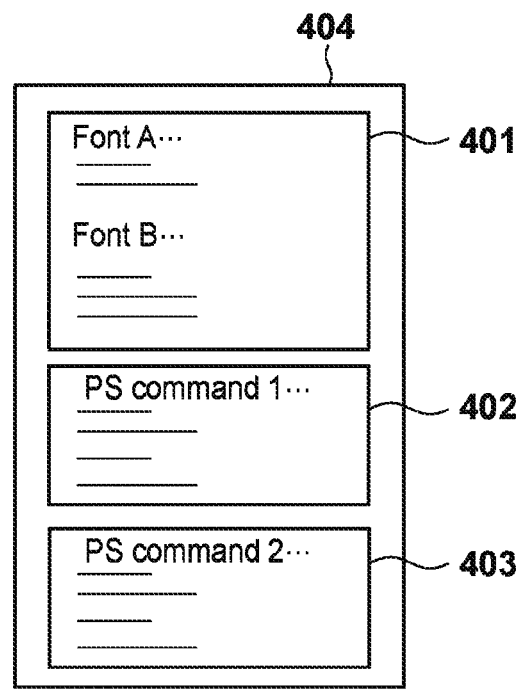
FIG. 9C is a diagram illustrating a state in which PS objects 1 and 2 have been consolidated in working example 1.
Figure 12:
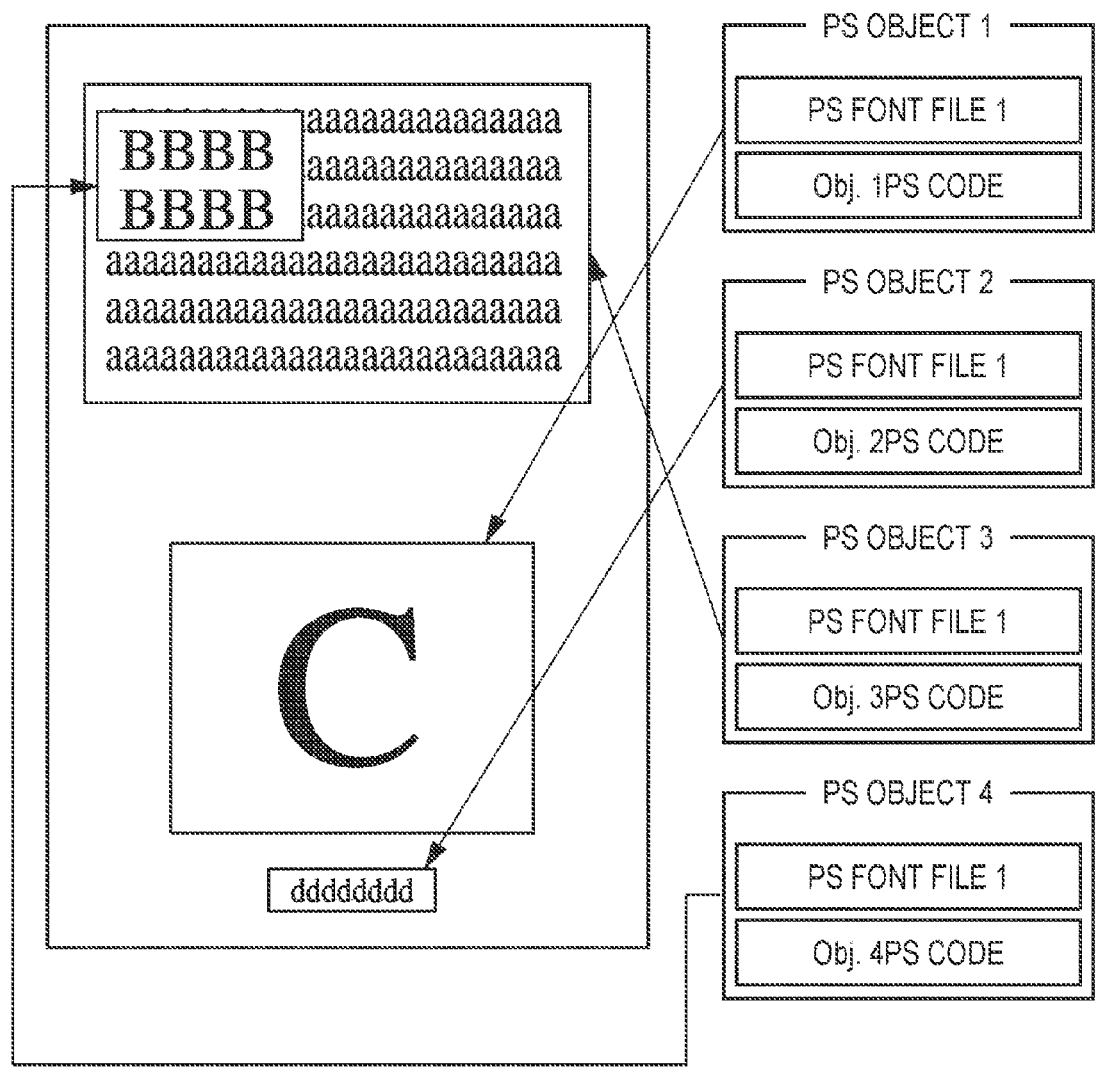
FIG. 12 is a diagram showing one example of PPML data.
Figure 13:
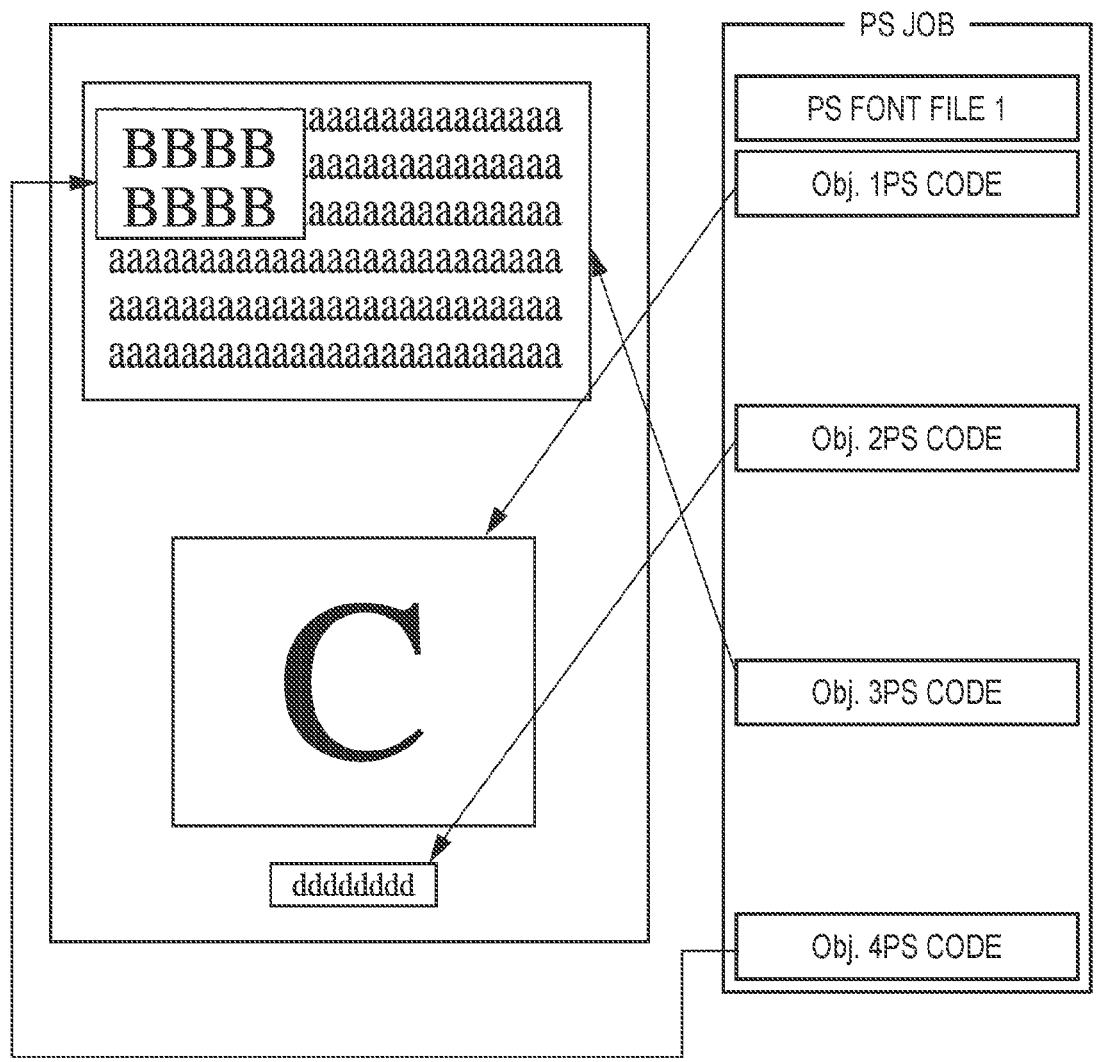
FIG. 13 is a diagram showing one example of PS data.

Description is given using the examples of the objects shown in FIG. 9A and FIG. 9B of processing in a case where the PPML interpreter 208 has determined at S1103 that the PS object 302 and the PS object 303 are described successively. First, at S1106, the PPML interpreter 208 deletes the PS resource file 401 from the contents of the PS object 303 and, next, at S1107, the PPML interpreter 208 consolidates the PS object 302 and the PS object 303. FIG. 9C illustrates a condition of the PS object 302 and the PS object 303, which have been consolidated by the processing of S1106 and S1107. By consolidating in this manner, the PS command file 402 and the PS command file 403 in FIG. 9C can both reference the PS resource file 401. Accordingly, the number of times of processing of the PS resource file 401 can be reduced by one time while maintaining the same rendered content as the case in which these are described as separate print objects as in FIG. 9A and FIG. 9B.

In a case where the targeted print objects are not described successively, the procedure proceeds to the process of S1104. As one example, suppose that the description order of the three objects on the page of FIG. 8 is in the order of the PS object 302, the JPEG object 304, and the PS object 303. In this case, although the identical PS resource file 401 is defined in the PS object 302 and the PS object 303, they are not described successively within the print data and the JPEG object 304 is described therebetween, and therefore these cannot be processed by being consolidated. In this case, the PPML interpreter 208 determines in the process of S1104 whether or not the description of the target print object can be made successive by swapping it in the drawing order with another print object. As shown in FIG. 8, the drawing ranges of the JPEG object 304 and the PS object 303 do not overlap, and therefore the final drawing result is not affected even if the drawing order of these two print objects is swapped. Additionally, if the drawing order of these two print objects is swapped and put into the order of the PS object 302, the PS object 303, and the JPEG object 304, then the target PS object 302 and PS object 303 are described successively. It should be noted that the JPEG object 304 is supposed as a third print object for example. In this case, the procedure proceeds to S1105 and the print data is changed so that the order of the JPEG object 302 and the PS object 303 is swapped. Next, the procedure proceeds to the already described processes of S1106 and S1107 where the deletion of the resource file and the consolidation of the print objects are carried out. It should be noted that determining the drawing order of objects (that is, the description order of objects) can be swapped based on the overlapping of objects is because, in a case where objects overlap, the first-drawn object will be overwritten by the later-drawn object. There are various types of processing for overlapping portions depending on factors such as the level of opacity of the top object and color logic calculations of the overlapping portions, and it is not always the case that these cannot be substituted only because the objects are overlapping. However, since substitution is possible at least as long as the objects are not overlapping, it is effective to use the presence/absence of overlapping in determining whether or not substitution is allowed so as to simplify processing.

In a case where consolidation of the print objects using an identical resource of interest is finished at S1107 or where it is determined at S1104 that the print object desired to be consolidated cannot be described successively even by swapping the drawing order with another print object, the procedure proceeds to S1108. That is, after the process of shortening the resource processing time has been completed for these print objects or after it has been determined that these print objects cannot be consolidated, the current object of interest group is excluded from the pre-parse targets. After this, a search is performed again at S1102 as to whether or not there is an item that can be consolidated among the other print objects remaining as pre-parse targets.

The series of processes from S1103 to S1108 are repeated for the number of times that the PPML interpreter 208 determines at S1102 that there is a print object using an identical resource file. When there are no more objects that can be consolidated among the print objects using identical resource files, the procedure proceeds to S1109. That is, the measure proposed by the present invention for shortening processing times is finished, and ordinary PPML print processing described in FIG. 3 is carried out.

According to the above-described procedure, if consolidation of objects does not affect the printing result, these objects are subjected to consolidation among print objects using common resource files.

Description is given of an effect of the invention described in the present working example. By executing the invention described in the present working example, no processing time is required for the resource file deleted at S1106, and the processing time of the print data can be shortened. Furthermore, in a case where the processing of S1104 and S1105 can be executed, shortened processing times can be achieved also in regard to print objects that are not described successively within the print data and for which the conventional technique could not be applied.

Embodiment 2

Figure 5:
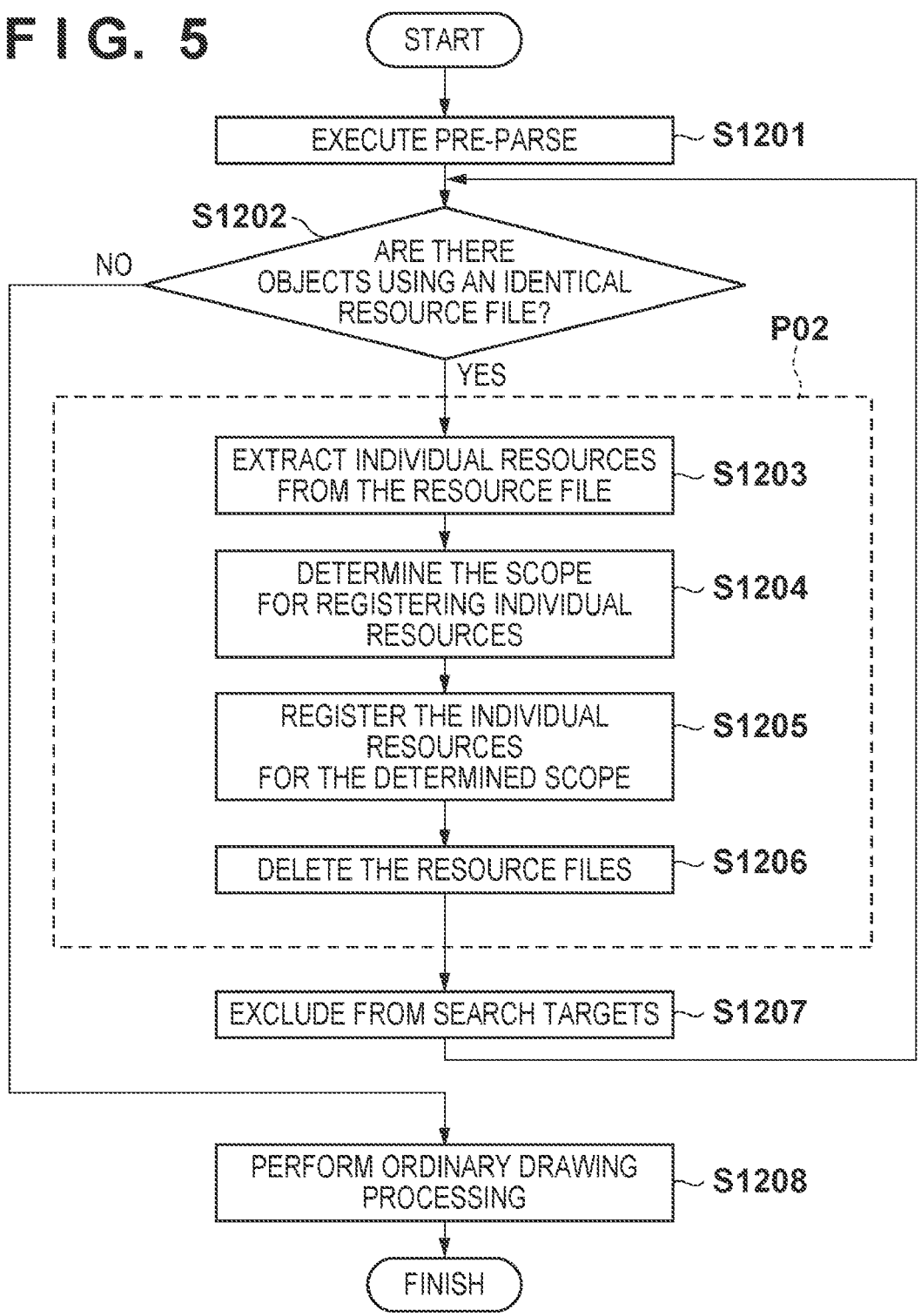
FIG. 5 is a flowchart of a method for shortening resource processing times according to working example 2.

In the present embodiment, description is given of a method different from embodiment 1 for shortening resource processing times. Description is given for the present working example also using an example of a case where the PS resource file processing time is to be shortened with respect to print data described in PPML in a same manner as embodiment 1. FIG. 5 shows an outline of a method for shortening resource processing times to be described in the present embodiment. Here, S1201 and S1202 are identical to S1101 and S1102 respectively in FIG. 4, and therefore description thereof is omitted.

At S1202, in a case where it has been determined that there are multiple print objects present using an identical resource file, the procedure proceeds to S1203. Specifically, S1202 is achieved by using the file names of the resource files and determining the presence/absence of identical file names. Here, as in embodiment 1, description is given using an example of a case where there is the page 301 of FIG. 8 within the print data, and an identical PS resource file 401 is defined in the PS object 302 and the PS object 303. At S1203, the PPML interpreter 208 and the PDF/PS interpreter 209 work in cooperation to interpret the PS resource file 401 and extract single resources. In the present embodiment, the extracted resources are referred to as individual resources. Multiple individual resources are extracted as individual resources from the PS resource file 401 such as single fonts, ProcSets, forms, and the like. More than only a single resource can be described within a resource file, and therefore multiple individual resources may be extracted. Here, description is given supposing that three individual resources, these being a font A, a font B, and a ProcSet 1, have been extracted as individual resources from the PS resource file 401.

Next, at S1204, the PPML interpreter 208 determines a scope for registering these individual resources. Scope refers to information contained in reusable objects and resources in VDP and the range in which each reusable object and resource is valid. With print data described by PPML, the scope can be selected for an entire job, a specific record or a specific page or the like. For example, in case where the scope of a certain resource A is for the fifth page, all the print objects arranged on the fifth page can reference the resource A, and print objects arranged in locations other than the fifth page cannot reference the resource A. It should be noted that the scope is decided based on the print objects from which the resource files are taken. For example, in a case where the resource file is taken from the print objects 302 and 303 arranged on the page 301, the scope of that resource file becomes only for the page 301. Furthermore, in a case where the resource file is taken from the print object 302 arranged on a first page and the print object 303 arranged on a second page to be processed as a first record, the scope of that resource file becomes the first record. Furthermore, in a case where the resource file is taken from the print object 302 of the first page to be processed as a first record and the print object 303 of a second page to be processed as a second record, the scope of that resource file becomes the entire print job. That is, the pages on which multiple objects are to be drawn using a single resource in common are decided as the scope of that resource. It should be noted that here a case is assumed where the resource files are taken from the print objects 302 and 303 arranged on the page 301, and therefore the PPML interpreter 208 decides that the scopes in which the three individual resources are registered are all for the pages 301.

At S1205, after the scope has been decided, the individual resources extracted by the PPML interpreter 208 at S1203 are registered in the scope decided at S1204. It should be noted that resource registration is executed by having the PPML interpreter 208 alter the print data. Following this, at S1206, the PPML interpreter 208 deletes the resource file interpreted at S1203 from the print objects detected at S1202. Description is given using FIG. 10 and FIG. 11 of a method for altering print data described by PPML. First, FIG. 10 shows an example of description within the PPML print data of the page 301 in FIG. 8. A PS object 501, a PS object 502, and a JPEG object 503 in FIG. 10 correspond to descriptions of the PS object 302, the PS object 303, and the JPEG object 304 in FIG. 8 respectively. As listed in the PS objects 501 and 502, the identical PS resource file 401 (PS resource A) is contained in the PS object 302 and the PS object 303. Next, FIG. 11 shows an example of description of print data after registration of individual resources and deletion of resource files have been carried out at S1205 and S1206. Here, numeral 601 is a description of registered individual resources. The three extracted individual resources, these being the font A, the font B, and the ProcSet 1, are registered in a format that can be referenced from the PS resource file 401 and the PS command file 402. It should be noted that since it has been decided at S1204 that the scope for which the individual resources are registered is the page 301, the individual resources are described at the head within tags of the page 301. Furthermore, a PS object 602 and a PS object 603 correspond to PS objects after the resource file 401 has been deleted from the PS objects 501 and 502 respectively. No operation is performed on the JPEG object 503 and it remains as it is.

By deconstructing and registering the resource files into individual resources in this manner, it is possible to carry out processing first at the stage when a print object is actually to use an individual resource. For example, suppose that of the font A, the font B, and the ProcSet 1, which are extracted individual resources, the font A and the font B are used by the PS object 1, and the font B and the ProcSet 1 are used by the PS object 2. In this case, if the measures described in the present working example are not applied, processing of the three individual resources is carried out for the relevant objects in the processing of the PS object 1 and PS object 2. On the other hand, when the present embodiment is applied, it becomes sufficient to process only the font A and the font B in the processing of the PS object 1, and to process only the font B and the ProcSet 1 in the processing of the PS object 2. That is, interpretation of the unnecessary ProcSet 1 is not executed in the processing of the PS object 1, and interpretation of the unnecessary font A is not executed in the processing of the PS object 2. As a result, compared to a case where the measures described in the present working example are not applied, the processing of the font A and the ProcSet 1 is reduced by one time, thereby enabling a shortening of the processing time.

An effect of the invention described in the present working example is as follows. When the measures described in the present working example are executed, it becomes possible to carry out processing of a resource only when a print object is to use an individual resource, and the processing times of individual resources not used by print objects can be shortened. Furthermore, with the measures described in embodiment 1, there are cases where the print objects cannot be made successive, and although in these cases there is no shortening effect of the processing times, there is no such limitation in the present invention described in the present embodiment. That is, the invention described in the present embodiment is applicable to a wider scope than the invention described in embodiment 1.

Embodiment 3

In the present working example, description is given of a method in which the methods for shortening resource processing times described in embodiments 1 and 2 are used in combination.

The method for shortening resource processing described in embodiment 1 has the advantage that the resource file processing itself can be omitted, but has the limitation that it can not be applied in cases where the objects cannot be consolidated. On the other hand, the process of shortening resource processing described in embodiment 2 has the advantage that it is applicable to an arbitrary object, but has the limitation that the time used in the process of extracting individual resources cannot be omitted. Accordingly, rather than using only one of the measures described in either embodiment 1 or 2, there are cases where an even higher effect can be expected by using these measures in combination.

Figure 6:
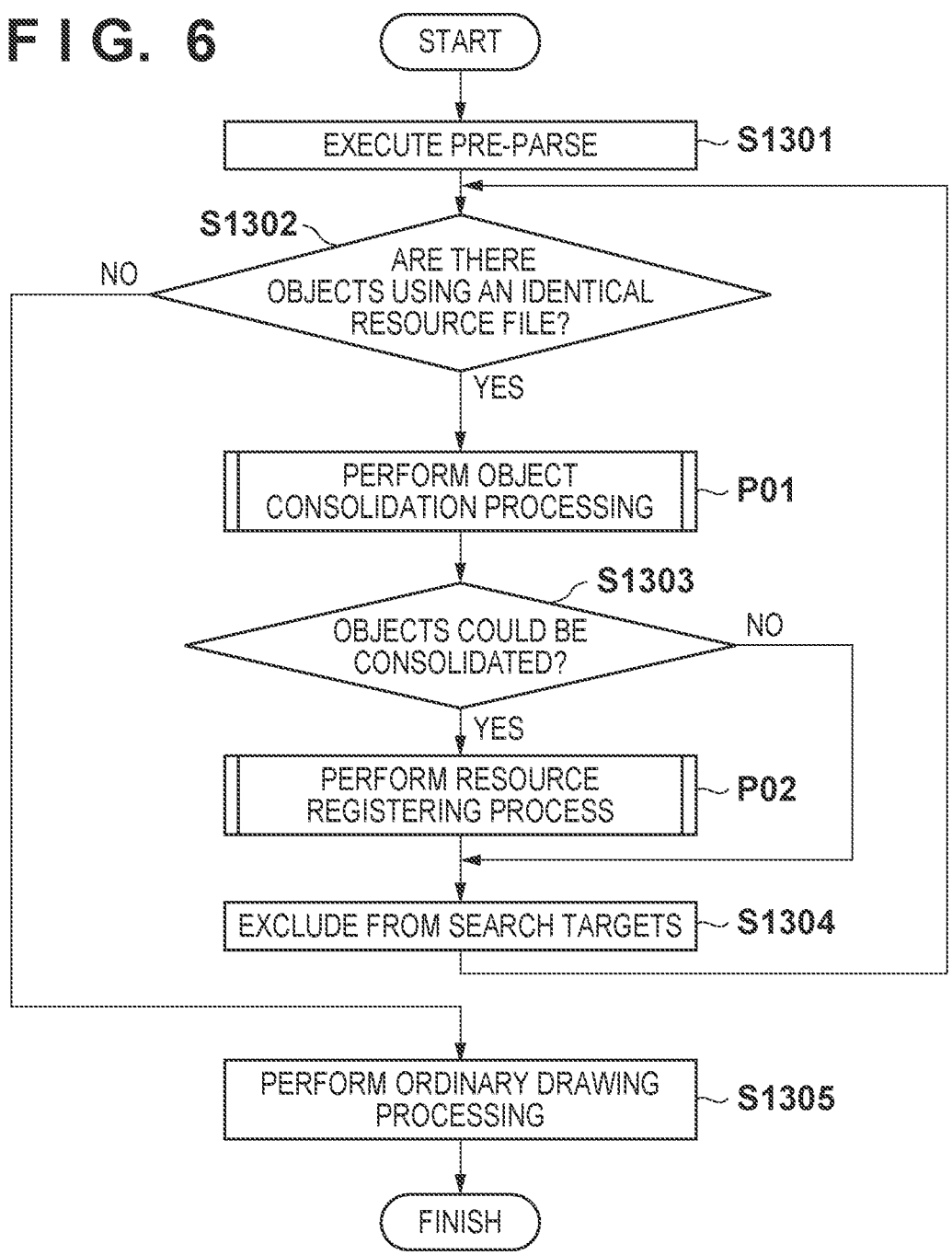
FIG. 6 is a flowchart showing differentiated use of methods for shortening resource processing times according to working example 3.

In the present embodiment, description is given using the flowchart in FIG. 6 of an example in which the resource processing shortening processes of embodiment 1 and embodiment 2 are combined. S1301 and S1302 in FIG. 6 are identical to processes described in embodiment 1, and therefore description thereof is omitted. Next, the procedure proceeds to an object consolidation process P01. This process is equivalent to P01 in FIG. 4, that is, to a process in which S1103, S1104, S1105, S1106, and S1107 are executed. In other words, the present method is applied by giving priority to the measure described in working example 1 in regard to print objects for which a shortening of resource processing times is desired. Note however that in a case where "no" is determined at S1104, data is stored to the effect that the objects could not be consolidated and a departure is made from the processing of P01. Furthermore, in a case where the objects have been consolidated at S1107, data is stored to the effect that the objects have been consolidated and a departure is made from the processing of P01. Next, at S1303, the PPML interpreter 208 determines whether the objects were able to be consolidated at P01, that is, whether the process of S1107 in FIG. 4 was executed, or whether it was determined as a result of the determination at S1104 that the objects could not be consolidated. In a case where the objects were able to be consolidated, the procedure proceeds to S1304 and S1302, and a search is performed as to whether or not the resource processing can be shortened with other print objects. This area also has already been described in working example 1, and therefore description thereof is omitted.

In a case where it is determined at S1303 that the object cannot be consolidated, then no shortening of the resource processing time can yet be performed on the print object found at S1302. For this reason, the procedure proceeds to P02 and achieves a shortening of the processing time by executing the processing of P02 (which indicates S1203, S1204, S1205, and S1206) of FIG. 5 described in embodiment 2.

If this processing configuration is provided, then the measure of embodiment 1 is executed first, for which can be expected a high effect in spite of a narrow range of applicability, and if this could not be applied, then the measure of embodiment 2 is executed. As a result, a higher effect can be expected than executing only one of either the processes for shortening resource processing times described in embodiments 1 and 2.

Embodiment 4

In the present working example, description is given of a method in which the methods for shortening resource processing times described in embodiments 1 and 2 are used in combination in a same manner as embodiment 3.

Figure 7:
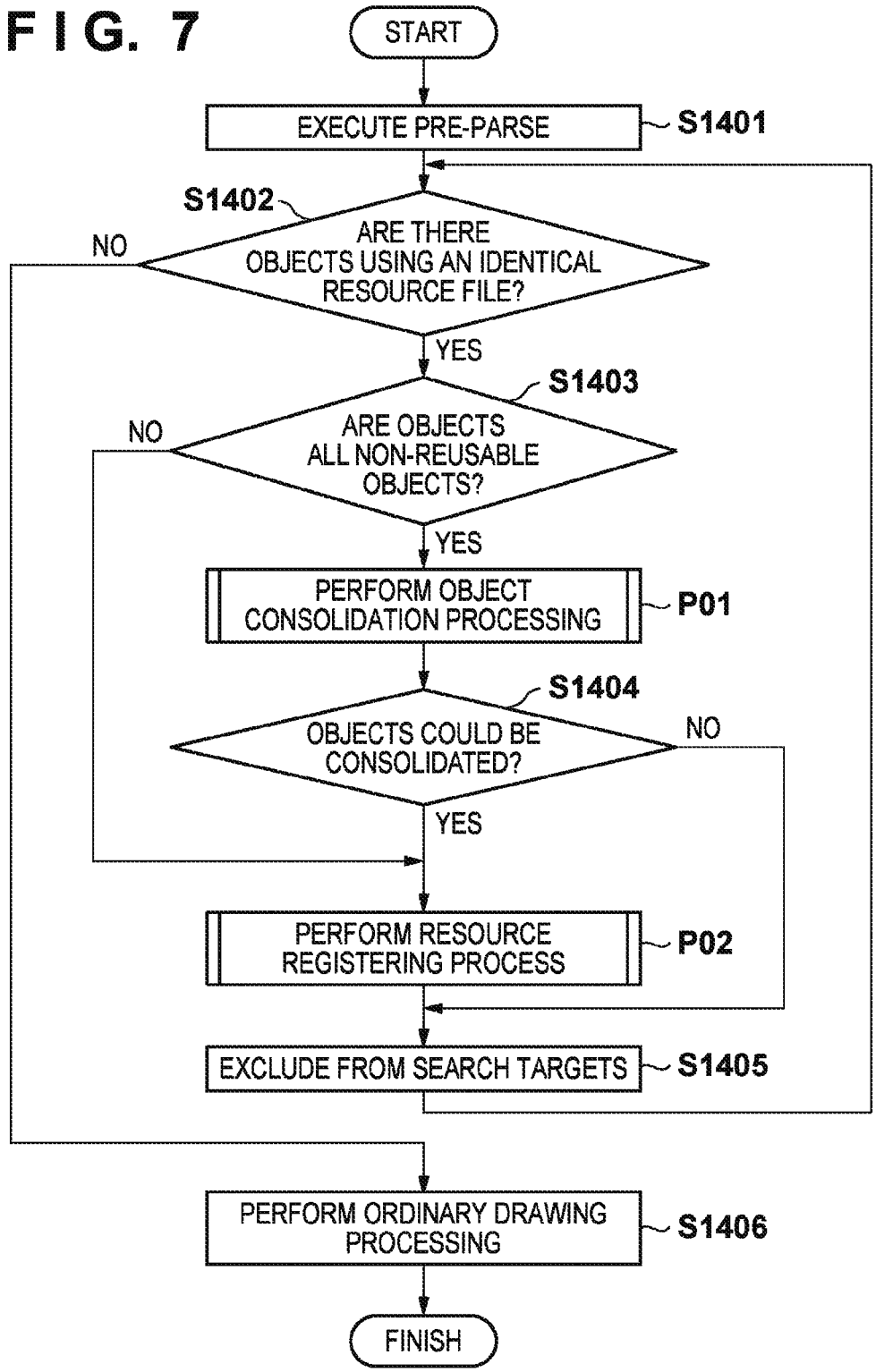
FIG. 7 is a flowchart showing differentiated use of methods for shortening resource processing times according to working example 4.

FIG. 7 shows a flowchart representing an outline of a method to be described in the present working example. A point of difference from the method described in embodiment 3 is that a process is added so that at S1403, the PPML interpreter 208 determines whether the objects found at S1402 are all non-reusable objects.

Due to the determination process of S1403, the methods for shortening resource processing times are differentiated for use in a following manner. Namely, if the objects found at S1402 are all non-reusable objects, then consolidation processing of objects is executed at P01. In a case where objects could not be consolidated at P01, and in a case where a reusable object is present among the objects found at S1402, the resource registering process of P02 is applied.

An effect of the processing configuration described in the present working example is as follows. When the print data processing apparatus 100 is to process variable print data, the image data of reusable objects is cached in the RAM 2 or HDD 4, and sometimes high speed processing can be achieved by reusing this when a given object is to be drawn a second time or thereafter. At this time, sometimes there is a problem such as extra data being included in the image data to be cached when other print objects are consolidated with the reusable objects. The present working example gives consideration to this case and does not carry out the object consolidation processing described in embodiment 1 on the reusable objects. Due to this, a shortening of resource processing times can be achieved without affecting the generation and reuse of cache data for conventional reusable objects.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-114108, filed May 20, 2011, which is hereby incorporated by reference herein in its entirety.

What is claimed is:

1. A print data processing apparatus, comprising:
   a receiving unit configured to receive print data having a first print object and a second print object on one page; and
   a consolidation unit configured to, in a case where a determination has been made that the first print object and the second print object are using identical resource files and a determination has been made that the first print object and the second print object are described successively within the print data, delete the identical resource file from the second print object and consolidate the first print object and the second print object.

2. The print data processing apparatus according to claim 1, further comprising:
   an extraction unit configured to, in a case where an identical resource is duplicated and described, extract an individual resource from the identical resource; and
   a resource registering unit configured to register the extracted individual resource in the print data in a format that can be referenced from the first print object and the second print object, and delete the registered individual resource from the first print object and the second print object.

3. A print data processing method, which is executed by a print data processing apparatus, comprising:
   a receiving step of receiving print data having a first print object and a second print object on one page; and
   a consolidation step of, in a case where a determination has been made that the first print object and the second print object are using identical resource files and a determination has been made that the first print object and the second print object are described successively within the print data, deleting the identical resource file from the second print object and consolidating the first print object and the second print object.

4. The print data processing method according to claim 3, further comprising:
   an extraction step of, in a case where an identical resource is duplicated and described, extracting an individual resource from the identical resource; and
   a resource registering step of registering the extracted individual resource in the print data in a format that can be referenced from the first print object and the second print object, and deleting the registered individual resource from the first print object and the second print object.

5. A non-transitory computer-readable medium on which is recorded a program for executing on a computer a print data processing method, wherein the method comprises:
   a receiving step of receiving print data having a first print object and a second print object on one page; and
   a consolidation step of, in a case where a determination has been made that the first print object and the second print object are using identical resource files and a determination has been made that the first print object and the second print object are described successively within the print data, deleting the identical resource file from the second print object and consolidating the first print object and the second print object.

* * * * *